United States Patent
Yoshimoto

(10) Patent No.: US 11,884,999 B2
(45) Date of Patent: *Jan. 30, 2024

(54) FE-BASED ALLOY FOR MELT-SOLIDIFICATION-SHAPING AND METAL POWDER

(71) Applicant: DAIDO STEEL CO., LTD., Nagoya (JP)

(72) Inventor: Takashi Yoshimoto, Nagoya (JP)

(73) Assignee: DAIDO STEEL CO., LTD., Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/982,818

(22) Filed: Nov. 8, 2022

(65) Prior Publication Data

US 2023/0151471 A1 May 18, 2023

(30) Foreign Application Priority Data

Nov. 10, 2021 (JP) ................. 2021-183724

(51) Int. Cl.

| | |
|---|---|
| *C22C 38/58* | (2006.01) |
| *C22C 38/50* | (2006.01) |
| *C22C 38/48* | (2006.01) |
| *C22C 38/46* | (2006.01) |
| *C22C 38/44* | (2006.01) |
| *C22C 38/42* | (2006.01) |
| *C22C 38/06* | (2006.01) |
| *C22C 38/04* | (2006.01) |
| *C22C 38/02* | (2006.01) |
| *C22C 38/00* | (2006.01) |
| *B33Y 70/00* | (2020.01) |

(52) U.S. Cl.
CPC .............. *C22C 38/58* (2013.01); *B33Y 70/00* (2014.12); *C22C 38/001* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01)

(58) Field of Classification Search
CPC .... B22F 1/05; B22F 1/065; B22F 1/16; B22F 10/25; B22F 10/28; B22F 2009/041; B22F 2009/0824; B22F 2009/0828; B22F 2201/02; B22F 2201/11; B22F 2201/12; B22F 2998/00; B22F 2999/00; B22F 5/007; B22F 9/10; B22F 9/12; B33Y 40/10; B33Y 70/00; B33Y 80/00; C22C 33/0257; C22C 38/001; C22C 38/002; C22C 38/02; C22C 38/04; C22C 38/06; C22C 38/42; C22C 38/44; C22C 38/46; C22C 38/48; C22C 38/50; C22C 38/58

See application file for complete search history.

(56) References Cited

U.S. PATENT DOCUMENTS

| | | | | | |
|---|---|---|---|---|---|
| 2,532,117 | A | * | 11/1950 | Newell | ................... C22C 38/44 420/92 |
| RE28,523 | E | * | 8/1975 | Hill | ....................... C22C 38/105 420/92 |
| 6,248,191 | B1 | * | 6/2001 | Luton | ...................... C21D 1/19 148/653 |
| 2016/0215375 | A1 | | 7/2016 | Kawano | |
| 2020/0399747 | A1 | | 12/2020 | Fukuzawa et al. | |

FOREIGN PATENT DOCUMENTS

| | | | | |
|---|---|---|---|---|
| JP | 50028417 | A | * | 3/1975 |
| JP | 50083220 | A | * | 7/1975 |
| JP | 6601051 | B2 | | 11/2019 |
| JP | 2020-045567 | A | | 3/2020 |

OTHER PUBLICATIONS

Hydrogen and Nitrogen Control in Ladle and Casting Operations (Year: 2005).*

\* cited by examiner

*Primary Examiner* — Jenny R Wu
(74) *Attorney, Agent, or Firm* — MCGINN I.P. LAW GROUP, PLLC.

(57) ABSTRACT

The present invention relates to a Fe-based alloy for melt-solidification-shaping containing: 0.05 mass %≤C≤0.25 mass %, 0.01 mass %≤Si≤2.0 mass %, 0.05 mass %≤Mn≤2.5 mass %, 2.5 mass %≤Ni≤9.0 mass %, 0.1 mass %≤Cr≤8.0 mass %, and 0.005 mass %≤N≤0.200 mass %, with the balance being Fe and unavoidable impurities, and satisfying: 11.5<15C+Mn+0.5Cr+Ni<20.

8 Claims, 2 Drawing Sheets

FE-BASED ALLOY FOR MELT-SOLIDIFICATION-SHAPING AND METAL POWDER

CROSS-REFERENCE TO RELATED APPLICATIONS

This application is based on and claims priority under 35 USC 119 from Japanese Patent Application No. 2021-183724 filed on Nov. 10, 2021, the contents of which are incorporated herein by reference.

TECHNICAL FIELD

The present invention relates to a Fe-based alloy for melt-solidification-shaping and a metal powder. Specifically, the present invention relates to a Fe-based alloy for melt-solidification-shaping, from which an object having small deformation during manufacturing, a high processing efficiency in an as-manufactured state and a low content of expensive alloying elements can be obtained through a melt-solidification-shaping such as overlaying welding and additive manufacturing, and relates to a metal powder having an average composition that is equivalent to that of the Fe-based alloy.

BACKGROUND ART

In recent years, metal additive manufacturing technology has attracted attention. This is because the metal additive manufacturing technology has the following advantages:
 (a) a metal part having a complex shape can be formed in a shape close to a final shape;
 (b) a degree of freedom in design is improved; and
 (c) a cutting margin is less than that in cutting in the related art.

Here, the "additive manufacturing method" refers to a method of preparing a three-dimensional structure by stacking, using various methods, a thin layer corresponding to a structure obtained by slicing the three-dimensional structure in a horizontal direction.

Examples of a method for stacking the thin layer include:
 (a) a method of repeating a step of forming a thin powder layer made of a metal powder and a step of locally melting and solidifying the powder layer by irradiation with an energy beam such as a laser beam or an electron beam; and
 (b) a method of stacking thin plates each having a given shape and diffusion-bonding the thin plates.

Among these, the additive manufacturing method of irradiating a spread metal powder layer with a laser beam to locally melt and solidify the powder layer is also called a "selective laser melting (SLM)". The SLM additive manufacturing method has an advantage that a complicated three-dimensional shape can be easily formed simply by changing an irradiation position of the laser beam.

In addition, the additive manufacturing method of irradiating a metal powder with a laser or electron beam while supplying the metal powder, and selectively depositing the molten metal on an existing member, a substrate, or a material to be overlaid is also called a "direct energy deposition (DED)".

When such an additive manufacturing method is applied to, for example, a preparation of a die-casting mold or a plastic-molding mold, a non-linear or three-dimensional water-cooling circuit can be freely disposed inside the mold.

In the related art, various proposals have been made regarding the metal powder for use in such additive manufacturing. For example, Patent Literature 1 discloses a steel powder containing predetermined amounts of C, Si, Cr, Mn, Mo, V, and N, with the balance being Fe and unavoidable impurities.

The same literature discloses the following points:
 (a) mold steels such as SKD61, SUS420J2, and a maraging steel in the related art have high temperature strength, but have low thermal conductivity because of containing elements such as Si, Cr, Ni, and Co that are easily dissolved in a matrix in large contents;
 (b) in this type of high-alloy steel, when the content of an alloying component that reduces the thermal conductivity is reduced and the amount of Cr is optimized, high thermal conductivity can be achieved while maintaining high corrosion resistance; and
 (c) such a steel powder is suitable as a powder for additive manufacturing.

Patent Literature 2 discloses a metal powder for additive manufacturing, which is made of a maraging steel containing predetermined amounts of C, Ni, Co, Mo, Ti, and Al with the balance being Fe and unavoidable impurities, and has a median diameter $D_{50}$ of 200 μm or less.

The same literature discloses the following points:
 (a) when additive manufacturing is performed by using a metal powder made of a maraging steel containing Ti, Ti segregates linearly, and the toughness of an additively manufactured object tends to decrease; and
 (b) when the content of Ti is controlled to be 0.1 mass % to 5.0 mass %, Ti segregation in the additively manufactured object can be prevented, and the toughness of the additively manufactured object can be improved.

Production of a plastic-molding mold by using an additive manufacturing technology has begun in order to shorten the delivery time and improve the molding quality by introducing a complicated water-cooling circuit. Powders of SUS420J2, a maraging steel, SKD61 or the like are often used in the additive manufacturing (SLM and DED) using a metal powder in the related art. The metal powder disclosed in Patent Literature 1 is excellent in thermal conductivity and corrosion resistance, and can thus be used for additive manufacturing of a plastic-molding mold. Similarly, the maraging steel powder disclosed in Patent Literature 2 is excellent in toughness, and can thus be used for additive manufacturing of a plastic-molding mold.

In the additive manufacturing of a plastic-molding mold, in order to improve the production capability, an additive manufacturing apparatus having both an additive manufacturing function and a cutting function is sometimes used. In this case, the cutting is performed in an as-manufactured state. It is preferable that the metal powder used in such an additive manufacturing apparatus satisfies the following three conditions.
 (a) Deformation during manufacturing is small and efficiency during finish-processing is high (small processing margin).
 (b) As-manufactured hardness is low, and processing efficiency in an as-manufactured state is high.
 (c) Contents of expensive alloying elements such as Ni, Co, and Mo are low, and production cost is low.

However, no example of a metal powder that satisfies all of the above three conditions has been proposed in the related art. For example, with SKD61 or the metal powder disclosed in Patent Literature 1, deformation of the additively manufactured object due to thermal stress during additive manufacturing tends to be large. When the deformation is large, dimensional accuracy of the manufactured mold may deteriorate, and the processing margin in processing may increase. Alternatively, it is necessary to design the mold after considering the deformation in advance, which may deteriorate processing efficiency.

In addition, deformation during additive manufacturing of SUS420J and a maraging steel is smaller than that of SKD61. However, since SUS420J2 has high as-manufactured hardness, a cutting tool wears heavily during cutting, resulting in low processing efficiency. On the other hand, the maraging steel has low as-manufactured hardness, and is relatively easy to process in an as-manufactured state. However, the maraging steel contains a large amount of expensive rare metals such as Ni, Co, and Mo, which requires a high production cost.

Patent Literature 1: Japanese Patent No. 6601051
Patent Literature 2: JP 2020-045567A

SUMMARY OF INVENTION

An object of the present invention is to provide a Fe-based alloy for melt-solidification-shaping, from which an object having small deformation during manufacturing, a high processing efficiency in an as-manufactured state and a low content of expensive alloying elements can be obtained through a melt-solidification-shaping such as overlaying welding and additive manufacturing.

Another object of the present invention is to provide a metal powder having an average composition equivalent to that of such a Fe-based alloy for melt-solidification-shaping.

In order to solve the above problems, a Fe-based alloy for melt-solidification-shaping according to the present invention contains:

0.05 mass %≤C≤0.25 mass %,
0.01 mass %≤Si≤2.0 mass %,
0.05 mass %≤Mn≤2.5 mass %,
2.5 mass %≤Ni≤9.0 mass %,
0.1 mass %≤Cr~8.0 mass %, and
0.005 mass %≤N≤0.200 mass %, with the balance being Fe and unavoidable impurities, and satisfies the following expression (1).

$$11.5<15C+Mn+0.5Cr+Ni<20 \quad (1)$$

A metal powder according to the present invention has an average composition equivalent to that of the Fe-based alloy for melt-solidification-shaping according to the present invention.

When additive manufacturing is performed by using a metal powder that contains predetermined elements and satisfies the expression (1), residual tensile stress generated in the cooling process after manufacturing is relaxed by volume expansion due to martensite transformation. As a result, deformation during additive manufacturing can be prevented.

In addition, since the metal powder according to the present invention has a carbon amount lower than that of SUS420J2, the as-manufactured hardness is low, and the processing efficiency in an as-manufactured state is high as compared with SUS420J2.

Further, the metal powder according to the present invention has a higher carbon amount and lower contents of Ni, Mo, and Co than those in the maraging steel. Therefore, the metal powder according to the present invention is lower in cost than the maraging steel. In addition, a decrease in hardness due to the decrease in contents of Ni, Mo and Co can be compensated for by an increase in hardness due to the increase in carbon amount (strengthening due to martensite transformation, precipitation strengthening due to precipitation of carbides, or the like).

DESCRIPTION OF EMBODIMENTS

Figure 1:
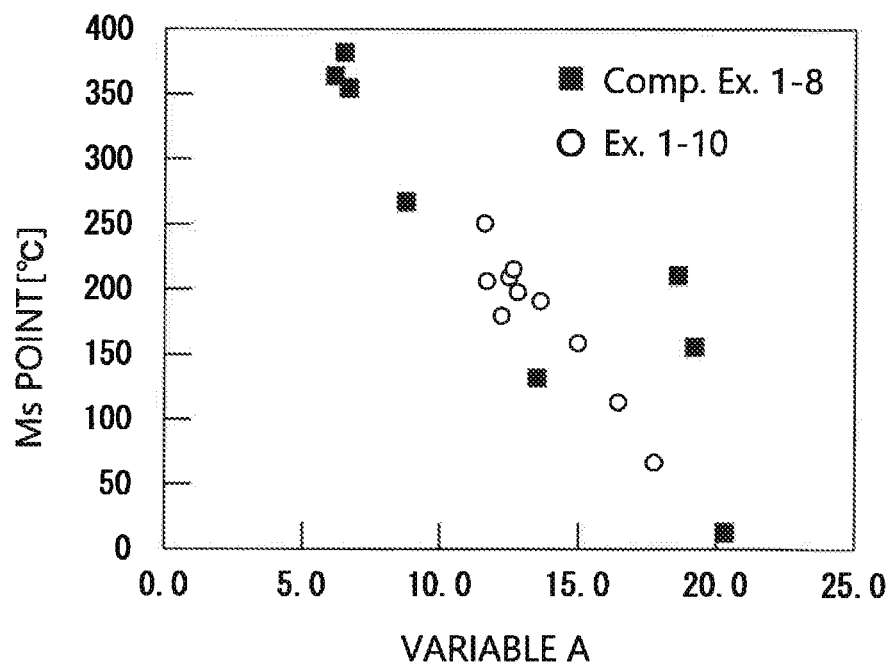
FIG. 1 is a diagram showing a relationship between a variable A and Ms point.

Hereinafter, an embodiment of the present invention will be described in detail.

[1. Fe-Based Alloy for Melt-Solidification-Shaping]
[1.1. Main Constituent Elements]

A Fe-based alloy for melt-solidification-shaping (hereinafter, simply referred to as "Fe-based alloy") according to the present embodiment contains the following elements, with the balance being Fe and unavoidable impurities. The types of the added elements, component ranges thereof, and the reasons for limitation are as follows.

(1) 0.05 mass %≤C≤0.25 mass %:

The amount of C influences the hardness of martensite immediately after overlaying welding or immediately after additive manufacturing (hereinafter collectively referred to as "immediately after manufacturing"). In general, as the amount of C increases, the hardness of martensite immediately after manufacturing increases. In addition, C is also an element that can effectively lower the Ms point. In the case where the amount of C is too low, the hardness immediately after manufacturing may decrease, or the Ms point may increase. Therefore, the amount of C is required to be 0.05 mass % or more. The amount of C is preferably 0.08 mass % or more, and more preferably 0.11 mass % or more.

On the other hand, in the case where the amount of C is excessive, the hardness immediately after manufacturing may be excessively high, which may deteriorate cutting efficiency. Therefore, the amount of C is required to be 0.25 mass % or less. The amount of C is preferably 0.22 mass % or less, and more preferably 0.19 mass % or less.

(2) 0.01 mass %≤Si≤2.0 mass %:

Si has an effect of improving machinability during cutting. In additive manufacturing, since the object is formed in a shape close to a finished shape, the cutting margin is small during cutting. Therefore, high machinability is not necessarily required. However, reducing the amount of Si excessively leads to an increase in refining costs during production and is not economical. Therefore, the amount of Si is set to be 0.01 mass % or more. The amount of Si is preferably 0.05 mass % or more, and more preferably 0.10 mass % or more.

On the other hand, in the case where the amount of Si is excessive, toughness may decrease. Therefore, the amount of Si is required to be 2.0 mass % or less. The amount of Si is preferably 1.5 mass % or less, more preferably 1.2 mass % or less, and still more preferably 0.5 mass % or less.

(3) 0.05 mass %≤Mn≤2.5 mass %:

Mn is an element effective for ensuring hardenability. In addition, Mn is also an element that effectively lowers Ms point. In the case where the amount of Mn is too low, hardenability may decrease or Ms point may increase. Therefore, the amount of Mn is required to be 0.05 mass % or more. The amount of Mn is preferably 0.1 mass % or more, and more preferably 0.3 mass % or more.

On the other hand, in the case where the amount of Mn is excessive, Ms point is greatly lowered, and deformation of the additively manufactured object may rather increase. Therefore, the amount of Mn is required to be 2.5 mass % or less. The amount of Mn is preferably 2.3 mass % or less, and more preferably 1.9 mass % or less.

(4) 2.5 mass %≤Ni≤9.0 mass %:

Ni is an element effective for ensuring hardenability. In addition, Ni is also an element that effectively lowers Ms point. In the case where the amount of Ni is too low, it may be difficult to lower Ms point. Therefore, the amount of Ni is required to be 2.5 mass % or more. The amount of Ni is preferably 2.8 mass % or more, more preferably 4.0 mass % or more, and still more preferably 5.0 mass % or more.

On the other hand, in the case where the amount of Ni is excessive, Ms point is greatly lowered, and deformation of the additively manufactured object may rather increase. Therefore, the amount of Ni is required to be 9.0 mass % or less. The amount of Ni is preferably 8.0 mass % or less, and more preferably 7.0 mass % or less.

(5) 0.1 mass %≤Cr≤8.0 mass %:

Cr forms a carbide or a nitride, which contributes to an improvement in hardness and wear resistance by finely dispersing in steel. In addition, Cr is also an element effective for ensuring hardenability and corrosion resistance. In the case where the amount of Cr is too low, hardenability and hardness may decrease. Therefore, the amount of Cr is required to be 0.1 mass % or more. The amount of Cr is preferably 0.5 mass % or more, and more preferably 0.8 mass % or more.

On the other hand, even in the case where Cr is added excessively, the effect on hardenability is saturated, so there is no practical benefit. Therefore, the amount of Cr is set to be 8.0 mass % or less. The amount of Cr is preferably 6.5 mass % or less, and more preferably 5.5 mass % or less.

(6) 0.005 mass %≤N≤0.200 mass %:

N is an element mixed into the Fe-based alloy when the molten metal is powdered by nitrogen atomization. Reducing the amount of N excessively causes a great rise in production cost. Therefore, the amount of N is set to be 0.005 mass % or more. The amount of N is preferably 0.010 mass % or more, and more preferably 0.015 mass % or more.

On the other hand, in the case where the amount of N is excessive, nitride formation is accelerated and toughness may be greatly lowered. Therefore, the amount of N is required to be 0.200 mass % or less. The amount of N is preferably 0.100 mass % or less, and more preferably 0.050 mass % or less.

(7) Unavoidable Impurities:

The Fe-based alloy according to the present embodiment may contain the components shown below in the amounts shown below. In such cases, these components are treated as unavoidable impurities in the present invention.

P≤0.05 mass %, S≤0.01 mass %, O≤0.08 mass %, Mo<0.20 mass %, W≤0.20 mass %, V<0.05 mass %, Al<0.30 mass %, Ti≤0.20 mass %, Cu<0.50 mass %, Co≤0.05 mass %, Sn≤0.05 mass %, Nb≤0.05 mass %, Ta≤0.05 mass %, Zr≤0.05 mass %, B≤0.01 mass %, Ca≤0.01 mass %, Se≤0.03 mass %, Te≤0.01 mass %, Bi≤0.01 mass %, Pb≤0.05 mass %, Mg≤0.02 mass %, and REM≤0.01 mass %.

[1.2. Auxiliary Constituent Elements]

The Fe-based alloy according to the present embodiment may further contain one or more of the following elements in addition to the above main constituent elements. The types of the added elements, component ranges thereof, and the reasons for limitation are as follows.

(1) 0.5 mass %≤Cu≤3.0 mass %:

Cu is an element that contributes to an improvement in hardness by being precipitated in steel as fine Cu particles by an aging treatment and dispersed therein. In order to obtain such an effect, the amount of Cu is preferably 0.5 mass % or more. The amount of Cu is more preferably 0.6 mass % or more.

On the other hand, in the case where the amount of Cu is excessive, not only the effect of contributing to the improvement in hardness is saturated, but also the production cost increases. Therefore, the amount of Cu is preferably 3.0 mass % or less. The amount of Cu is more preferably 2.5 mass % or less, and still more preferably 1.5 mass % or less.

(2) 0.2 mass %≤Mo≤2.0 mass %:

Mo is an element that forms a carbide or a nitride, which contributes to an improvement in hardness and wear resistance by finely dispersing in steel. In order to obtain such effects, the amount of Mo is preferably 0.2 mass % or more. The amount of Mo is more preferably 0.3 mass % or more.

On the other hand, in the case where the amount of Mo is excessive, the amount of precipitation of carbides or Laves phases may increase, which may decrease toughness. Therefore, the amount of Mo is preferably 2.0 mass % or less. The amount of Mo is more preferably 1.8 mass % or less, and still more preferably 1.2 mass % or less.

(3) 0.05 mass %≤V≤0.1 mass %:

Similar to Mo, V is an element that forms a carbide or a nitride, which contributes to an improvement in hardness and wear resistance by finely dispersing in steel. In order to obtain such effects, the amount of V is preferably 0.05 mass % or more.

On the other hand, in the case where the amount of V is excessive, it may form a carbide and increase tool wear during cutting. Therefore, the amount of V is preferably 0.1 mass % or less. The amount of V is more preferably 0.08 mass % or less.

The Fe-based alloy according to the present embodiment may contain either Mo or V, or may contain both.

(4) 0.3 mass %≤Al≤1.5 mass %:

Al forms an intermetallic compound with Ni during tempering and precipitates in steel. Precipitation of the intermetallic compound contributes to an improvement in hardness. In order to obtain such an effect, the amount of Al is preferably 0.3 mass % or more.

On the other hand, in the case where the amount of Al is excessive, the intermetallic compound or a nitride is excessively increased, which may decrease toughness. Therefore, the amount of Al is preferably 1.5 mass % or less. The amount of Al is more preferably 1.3 mass % or less, and further preferably 1.2 mass % or less.

[1.3. Component Balance]

The Fe-based alloy according to the present embodiment satisfies the following expression (1).

$$11.5 < 15C + Mn + 0.5Cr + Ni < 20 \tag{1}$$

The "15C+Mn+0.5Cr+Ni" (hereinafter, also referred to as a "variable A") in the expression (1) correlates with the Ms point of the Fe-based alloy. All of the elements in the variable A have the effect of lowering the Ms point. In the Fe-based alloy according to the present embodiment, when the variable A is optimized to satisfy the expression (1), the Ms point of the Fe-based alloy can be set in a range suitable for additive manufacturing (specifically, about 50° C. to about 280° C.).

The variable A is obtained by multiplying the content (mass %) of each element by a predetermined coefficient and adding them together.

In the case where the Ms point of the Fe-based alloy is too low, the amount of residual austenite immediately after additive manufacturing is excessive, and sufficient hardness cannot be obtained. In addition, even when the material is cooled to room temperature immediately after additive manufacturing, the amount of martensite transformation is small and thus, an effect of reducing distortion due to transformation expansion may not be obtained. Therefore, the Ms point is preferably 50° C. or higher. The variable A is preferably less than 20 in order to achieve the Ms point to be equal to or greater than the above value.

On the other hand, in order to obtain the effect of reducing distortion due to transformation expansion, it is necessary to heat the manufactured object immediately after additive manufacturing to a temperature lower than the Ms point and higher than a temperature at which the martensite transformation is completely completed (Mf point). The current additive manufacturing apparatus can only heat up to 200° C. due to equipment restrictions. In the case where the heating temperature for the manufactured object is 200° C. and the Ms point of the metal powder (Fe-based alloy) is higher than 280° C., the heating temperature is too low and thus, the martensite transformation is almost completed immediately after additive manufacturing, and the effect of reducing distortion due to transformation expansion cannot be obtained.

Even if it is possible to heat the additively manufactured object to 200° C. or higher, in the case where the Ms point is 280° C. or higher, the temperature required for heating is equal to or higher than the temperature at which bainite transformation occurs. Therefore, expansion due to bainite transformation occurs during additive manufacturing, and the effect of reducing distortion due to transformation expansion cannot be obtained. Therefore, the Ms point is preferably 280° C. or lower. The variable A is preferably more than 11.5 in order to achieve the Ms point to be equal to or smaller than the above value.

[1.4. Shape]

In the present embodiment, the shape of the Fe-based alloy is not particularly limited. Examples of the shape of the Fe-based alloy include lump, rod, tube, wire, powder, and the like. In particular, a powder is suitable as a raw material for melt-solidification-shaping.

[2. Metal Powder]

A metal powder according to the present embodiment has an average composition equivalent to that of the Fe-based alloy for melt-solidification-shaping according to the present invention.

[2.1. Component]

The expression "average composition equivalent to that of the Fe-based alloy for melt-solidification-shaping" refers to:
(a) a metal powder composed of one type of metal particles having the same composition in which the individual metal particle has a composition within the range described above;
(b) a metal powder composed of a mixture of two or more types of metal particles having different compositions in which the individual metal particle has a component within the range described above; and
(c) a metal powder composed of a mixture of two or more types of metal particles having different compositions in which one or more types of the metal particles does not has a composition falling within the range described above, but the average value of the composition of the entire metal powder is within the range described above.

In the case where the metal powder is composed of a mixture of two or more types of metal particles having different compositions, the individual metal particles may be pure metal particles composed of a single metal element, or may be alloy particles containing two or more metal elements. In the case where the metal powder is composed of a mixture, the average composition can be determined, for example, by extracting a sample of about 10 g from the mixture and analyzing the sample by using a method such as fluorescent X-ray analysis, combustion infrared absorption, or plasma emission spectrometry.

The details of the composition (average composition) of the metal powder are the same as those of the Fe-based alloy described above, so the description is omitted.

[2.2. Average Particle Diameter]

The term "average particle diameter" refers to the number frequency $D_{50}$ (μm), i.e., the cumulative 50% of the number particle diameter (median diameter) of the powder. Examples of a method of measuring $D_{50}$ include:
(a) a measurement method using a particle distribution measuring apparatus based on a laser diffraction/scattering method;
(b) a measurement method using a particle image analyzer;
(c) a measurement method using a coulter counter; and the like.

In the present embodiment, the term "$D_{50}$" refers to the median diameter measured by a particle distribution measuring apparatus based on the laser diffraction/scattering method.

The average particle diameter and particle diameter distribution of the metal powder can be controlled by production conditions of the metal powder and classification conditions of the metal powder.

In general, the content of fine powder (particles having a particle diameter of 10 μm or less) increases relatively as $D_{50}$ increases. An adhesive force generated between particles such as a van der Waals force and an electrostatic force increases as the particle diameter decreases. Therefore, in the case where $D_{50}$ is too low, the powder tends to agglomerate, resulting in poor fluidity. Therefore, $D_{50}$ is preferably 10 μm or more. $D_{50}$ is more preferably 20 μm or more, and further preferably 30 μm or more.

On the other hand, in the case where $D_{50}$ is too large, frictional force generated on the powder surface is more dominant than the adhesive force generated between particles. Therefore, shear resistance during powder flow is increased, and the fluidity is inhibited. Therefore, $D_{50}$ is preferably 50 μm or less.

[2.3. Particle Shape]

The particle shape of individual metal particles contained in the metal powder is not particularly limited. The metal particles may be spherical particles or irregularly shaped particles. In order to obtain high fluidity, the metal particles are preferably spherical particles.

[2.4. Surface Coating]

The surface of the metal particles may be coated with nanoparticles. The term "nanoparticle" refers to inorganic compound particles having a diameter of 1 nm or more and 100 nm or less.

In the case where the surface of the metal particles is coated with certain nanoparticles, agglomeration of the metal particles can be prevented in some cases. Examples of the nanoparticles having such an effect of preventing agglomeration of metal particles include metal oxides such as silica ($SiO_2$), alumina ($Al_2O_3$), manganese oxide (MnO), iron oxide ($Fe_2O_3$), calcium oxide (CaO), and magnesium oxide (MgO).

In the case where the surface of the metal particle is coated with nanoparticles, if the coating amount is too low, agglomeration of the metal particles may not be sufficiently prevented. Therefore, the content of nanoparticles is preferably 0.005 mass % or more.

On the other hand, in the case where the coating amount of the nanoparticles is excessive, the nanoparticles may serve as inclusions, which may reduce strength and/or toughness of the manufactured object when melt-solidification-shaping is performed. Therefore, the content of nanoparticles is preferably 0.05 mass % or less.

[2.5. Use]

The metal powder according to the present embodiment can be used as a raw material powder for melt-solidification-shaping.

Here, the term "melt-solidification-shaping method" refers to a method of forming the entire or a part of a manufactured object by melting a metal powder by using various heat sources and solidifying and depositing the molten metal powder.

The expression "forming the entire manufactured object" refers to forming the entire manufactured object only by melting, solidifying, and depositing the metal powder.

The expression "forming a part of a manufactured object" refers to stacking, on a surface of a base material that constitutes another part of the manufactured object, a new layer that constitutes the part of the manufactured object by melting, solidifying, and depositing the metal powder (e.g., repair of a mold).

Typical examples of the melt-solidification-shaping method include:

(a) a direct energy deposition (DED) method;
(b) a powder bed fusion method; and
(c) a plasma overlaying welding method.

Among these, the "direct energy deposition (DED) method" refers to a method of irradiating a metal powder with a laser or an electron beam while supplying the metal powder, and selectively depositing the molten metal on an existing member, a substrate, or a material to be overlaid. In the DED method, a metal layer can be repeatedly deposited and can be overlaid in various shapes such as line, wall, and block. In the case where an apparatus using a laser as a heat source is used, the volume of the melt to be deposited can be reduced, and deterioration in quality due to mixing of components occurring at an interface with the material to be overlaid can be prevented. Therefore, various materials such as a Fe-based alloy, a Ni-based alloy, and a Co-based alloy can be used as the material to be overlaid.

The "powder bed fusion method" refers to a manufacturing method of creating slice data in units of several tens of μm based on three-dimensional data (e.g., STL data) generated by 3D-CAD or the like, selectively scanning and irradiating a powder bed with a laser or electron beam based on the obtained slice data, and stacking the sintered layer. The SLM method is one of the powder bed fusion method.

The "plasma overlaying welding method" refers to a method in which a plasma arc is generated between an electrode and a base material, a metal powder is introduced into the plasma arc to melt the metal powder, and the metal is overlaid on the base material surface.

[2. Method for Producing Metal Powder]

In the present embodiment, the method for producing the metal powder is not particularly limited. Examples of the method for producing the metal powder include a gas atomization method, a water atomization method, a plasma atomization method, a plasma rotating electrode method, a centrifugal force atomization method, and the like.

For example, in the case of producing the metal powder by using a gas atomization method, a high-pressure gas is blown onto the molten metal while the molten metal is dropped from a bottom of a tundish, to thereby pulverize and solidify the molten metal. In this case, an inert gas such as nitrogen gas, argon gas or helium gas can be used as the high-pressure gas. In the case of producing the metal powder by using a gas atomization method, impurities such as P, S, Cu, Co, Ti, Zr, and Nb may be mixed unavoidably.

Further, the metal powder may be produced by mixing two or more types of metal powders and using, for example, a mechanical alloying method.

In addition, after producing the metal powder by using any one of the methods, the metal powder may be further subjected to a spheroidizing treatment using reducing thermal plasma. Alternatively, in order to improve fluidity of the metal powder, the particle surface may be coated with an appropriate amount of nanoparticles after the powder is produced. The particle diameter distribution of the metal powder can be controlled by production conditions, and can also be controlled by classification methods such as a wet cyclone, a dry cyclone, a dry sieve, and an ultrasonic sieve.

[4. Effect]

In the case where additive manufacturing is performed by using a metal powder that contains predetermined elements and satisfies the expression (1), residual tensile stress generated in the cooling process after manufacturing is relaxed by volume expansion due to martensite transformation. As a result, deformation during the additive manufacturing can be prevented.

In addition, since the metal powder (Fe-based alloy) according to the present embodiment has a carbon amount lower than that of SUS420J2, the as-manufactured hardness is low, and the processing efficiency in an as-manufactured state is high.

The maraging steel is an age-hardening ultra-high-strength steel obtained by adding a large amount of age-hardening elements such as Mo and Co to a low-carbon 18% Ni steel. In the case where additive manufacturing is performed by using a maraging steel powder, and the manufactured object is subjected to an aging treatment, high hardness is obtained. However, Ni, Mo and Co are all expensive elements. In the case where the content of these elements is reduced in order to reduce the production cost, the required hardness may not be obtained.

In contrast, the metal powder (Fe-based alloy) according to the present embodiment has a higher carbon amount and lower contents of Ni, Mo, and Co than those in the maraging steel. Therefore, the metal powder (Fe-based alloy) according to the present embodiment is lower in cost than the maraging steel. In addition, the decrease in hardness due to the decrease in contents of Ni, Mo and Co can be compensated for by the increase in hardness due to the increase in carbon amount (strengthening due to martensite transformation, precipitation strengthening due to precipitation of carbides, etc.).

EXAMPLES

Examples 1 to 10 and Comparative Examples 1 to 8

[1. Preparation of Sample]
[1.1. Preparation of Metal Powder]

By using a gas atomization method, 18 types of steel powders having compositions shown in Table 1 (balance is Fe) were prepared. The steel powder listed in Table 1 may contain elements not listed in the table as impurities within the above specified amounts. Comparative Example 2 corresponds to a hot work tool steel (JIS SKD61), Comparative Example 3 corresponds to a martensitic stainless steel (JIS SUS420J2), and Comparative Example 4 corresponds to an 18Ni maraging steel.

from the metal 3D printer, and the base plate with the additively manufactured object was placed on a surface plate. An appearance photograph of the manufactured object as a whole was taken from a horizontal direction. A curvature radius R and a thickness t of the additively manufactured object were calculated by image analysis on the appearance photograph. Then, the distortion after manufacturing was calculated by the following equation (2).

$$\text{Distortion after manufacturing } (\%) = t \times 100/(2R+t) \qquad (2)$$

TABLE 1

| | Composition (mass %) | | | | | | | | | | | | Variable |
|---|---|---|---|---|---|---|---|---|---|---|---|---|---|
| | C | Si | Mn | Ni | Cu | Cr | Mo | V | N | Al | Ti | Co | Others | A |
| Comp. Ex. 1 | 0.22 | 0.20 | 0.41 | 0.1 | 0.05 | 5.40 | 1.00 | 0.33 | 0.030 | | | | | 6.5 |
| Comp. Ex. 2 | 0.37 | 1.02 | 0.39 | 0.1 | 0.02 | 5.50 | 1.30 | 0.93 | 0.015 | | | | | 8.8 |
| Comp. Ex. 3 | 0.40 | 1.00 | 0.40 | 0.3 | 0.10 | 13.50 | 0.20 | 0.05 | 0.030 | | | | | 13.5 |
| Comp. Ex. 4 | 0.02 | 0.02 | 0.03 | 18.3 | 0.02 | | 5.20 | | 0.020 | 0.20 | 1.00 | 8.2 | | 18.6 |
| Comp. Ex. 5 | 0.05 | 0.50 | 0.40 | 3.0 | 1.20 | 4.00 | 0.50 | | 0.010 | 0.60 | | | | 6.2 |
| Comp. Ex. 6 | 0.01 | 0.02 | 0.05 | 19.0 | 0.02 | | 2.50 | | 0.020 | 0.10 | 0.80 | 0.2 | | 19.2 |
| Comp. Ex. 7 | 0.33 | 0.80 | 1.70 | 9.5 | | 8.30 | 2.00 | 0.50 | 0.010 | | | | | 20.3 |
| Comp. Ex. 8 | 0.12 | 0.30 | 1.65 | 3.2 | 1.00 | 0.19 | 0.22 | 0.05 | 0.005 | 0.94 | | | | 6.7 |
| Ex. 1 | 0.13 | 0.26 | 1.65 | 7.9 | 1.21 | 0.19 | 0.21 | | 0.020 | 1.10 | | 0.02 | 0.01P | 11.6 |
| Ex. 2 | 0.24 | 0.06 | 0.07 | 6.3 | | 5.33 | 1.40 | 0.08 | 0.030 | 0.02 | | | 0.12W | 12.6 |
| Ex. 3 | 0.06 | 1.35 | 2.04 | 7.0 | 1.02 | 5.76 | 0.44 | 0.02 | 0.020 | 1.44 | | | | 12.8 |
| Ex. 4 | 0.13 | 0.54 | 1.91 | 7.2 | 0.12 | 7.81 | 0.03 | 0.09 | 0.014 | 0.95 | | | | 15.0 |
| Ex. 5 | 0.22 | 0.78 | 1.80 | 8.6 | 0.02 | 5.41 | 0.92 | | 0.030 | | | | | 16.4 |
| Ex. 6 | 0.23 | 0.42 | 2.40 | 2.5 | 1.33 | 7.78 | | 0.04 | 0.010 | | | 0.01 | | 12.2 |
| Ex. 7 | 0.15 | 0.36 | 1.85 | 7.3 | 2.89 | 2.10 | 0.26 | 0.05 | 0.007 | 0.90 | | | 0.01S | 12.5 |
| Ex. 8 | 0.22 | 1.83 | 0.95 | 5.3 | 1.04 | 4.20 | 1.78 | | 0.020 | 0.02 | 0.01 | | | 11.7 |
| Ex. 9 | 0.10 | 0.34 | 1.55 | 8.5 | 2.03 | 4.03 | 0.02 | | 0.020 | 0.61 | | | 0.04Nb | 13.6 |
| Ex. 10 | 0.23 | 0.02 | 2.38 | 8.3 | | 7.19 | 1.36 | 0.09 | 0.080 | | | | | 17.7 |

* blank means <0.01 mass % in the Table 1.

[1.2. Preparation of Additively Manufactured Object]

An object (a cube of 15 mm×15 mm×15 mm) for measuring Ms point and hardness was prepared through additive manufacturing using a metal 3D printer M2 manufactured by Concept Laser. The conditions for the additive manufacturing were the same as the conditions for an evaluation test of the manufacturing property to be described later.

[2. Test Method]

[2.1. Ms Point]

A test piece (φ4 mm×10 mm) for transformation point measurement was cut out from the additively manufactured object in an as-manufactured state. The test piece was heated to 1,000° C. to 1,300° C., then cooled to 20° C. at a cooling rate of 100° C./min, and a temperature change and a dimensional change during cooling were measured.

[2.2. As-Manufactured Hardness]

A test piece for hardness measurement was cut out from the vicinity of the central portion of the additively manufactured object in an as-manufactured state. The Rockwell hardness (JIS Z2245: 2016) of the obtained test piece was measured.

[2.3. Distortion after Manufacturing]

An object having a length of 18 mm, a width of 30 mm, and a height of 10 mm was prepared on a strip-shaped base plate having a length of 20 mm, a width of 150 mm, and a height of 15 mm through additive manufacturing using a metal 3D printer M2 manufactured by Concept Laser. The energy density was set to 85 J/mm². The additive manufacturing was performed while preheating the additively manufactured object to a temperature of Ms-30° C. to Ms-80° C. by using a heater. The atmosphere during the manufacturing was a nitrogen atmosphere.

After completion of the additive manufacturing, the base plate with the additively manufactured object was taken out Here, in the equation (2), the curvature radius R was defined as a negative value when the additively manufactured object is deformed to be convex downward (i.e., convex toward the base plate side), and the curvature radius R was defined as a positive value when the additively manufactured object was deformed to be convex upward.

The curvature radius R can also be calculated by placing the base plate on the surface plate, measuring the dimension from the surface plate at regular intervals in the longitudinal direction of the manufactured object with a laser displacement meter or a stylus type dimension-measuring instrument, and approximating the displacements as a circle.

[3. Results]

Figure 2:
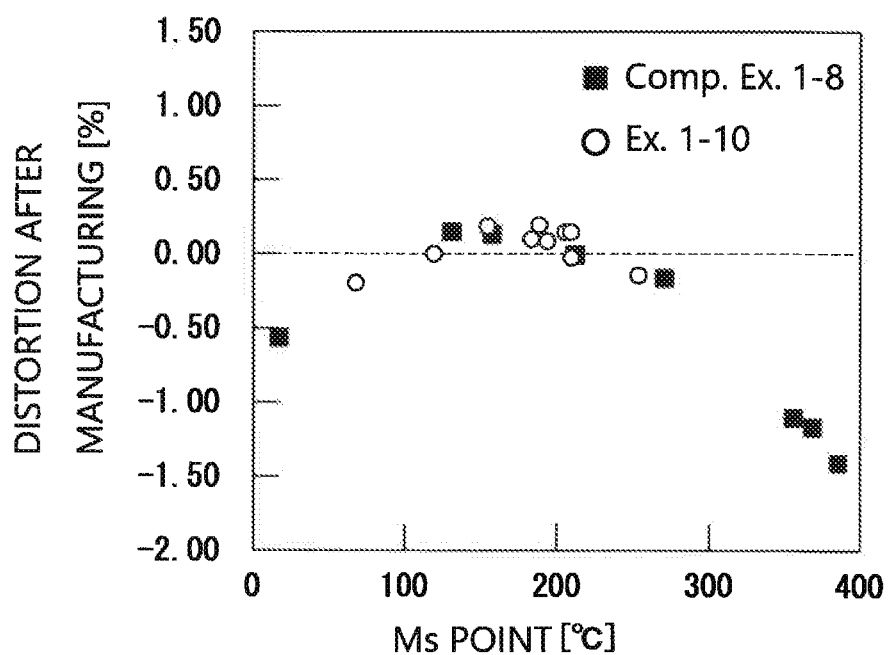
FIG. 2 is a diagram showing a relationship between Ms point and a distortion after manufacturing.
Figure 3:
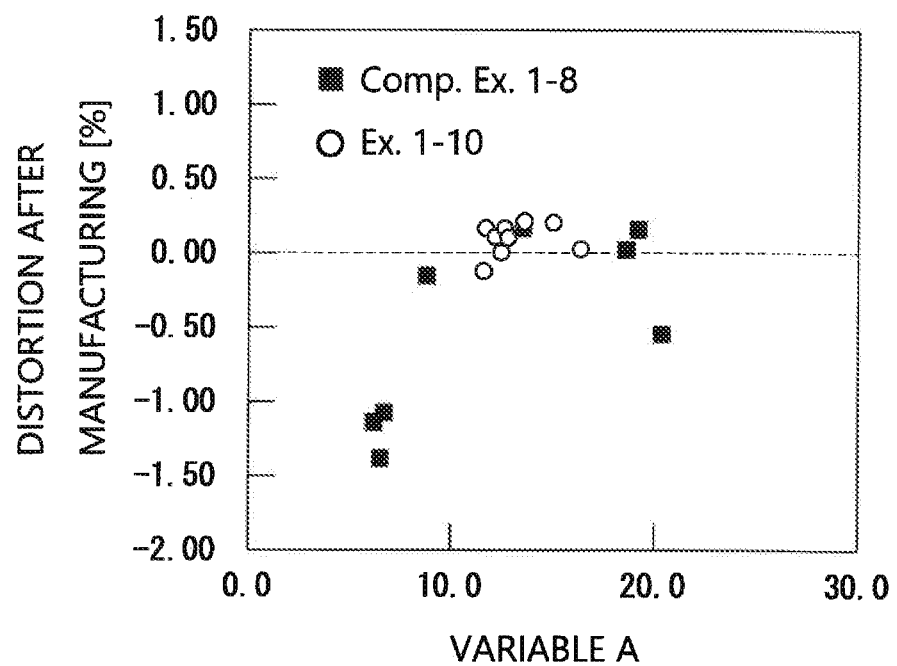
FIG. 3 is a diagram showing a relationship between the variable A and the distortion after manufacturing.

The results are shown in Table 2. FIG. 1 shows a relationship between the variable A and the Ms point. FIG. 2 shows a relationship between the Ms point and the distortion after manufacturing. FIG. 3 shows a relationship between the variable A and the distortion after manufacturing.

TABLE 2

| | As-manufactured hardness | Ms point (° C.) | Distortion after manufacturing (%) |
|---|---|---|---|
| Comparative Example 1 | 49 | 384 | −1.39 |
| Comparative Example 2 | 54 | 269 | −0.16 |
| Comparative Example 3 | 55 | 130 | 0.17 |
| Comparative Example 4 | 36 | 210 | 0.01 |
| Comparative Example 5 | 41 | 366 | −1.15 |
| Comparative Example 6 | 38 | 156 | 0.15 |

TABLE 2-continued

| | As-manufactured hardness | Ms point (° C.) | Distortion after manufacturing (%) |
|---|---|---|---|
| Comparative Example 7 | 32 | 15 | −0.55 |
| Comparative Example 8 | 38 | 354 | −1.09 |
| Example 1 | 38 | 252 | −0.13 |
| Example 2 | 49 | 209 | 0.16 |
| Example 3 | 35 | 192 | 0.10 |
| Example 4 | 40 | 153 | 0.20 |
| Example 5 | 44 | 118 | 0.02 |
| Example 6 | 50 | 182 | 0.11 |
| Example 7 | 42 | 209 | 0.00 |
| Example 8 | 47 | 204 | 0.16 |
| Example 9 | 37 | 187 | 0.20 |
| Example 10 | 38 | 66 | −0.18 |

Table 2 and FIG. 1 to FIG. 3 reveal the followings.

(1) In Comparative Examples 1, 5, and 8, the distortion after manufacturing was large, and the absolute value of the distortion was more than 0.3%. It is considered that this is because the Ms point was higher than 280° C. due to the excessively small variable A.

(2) in Comparative Examples 2 and 3, the as-manufactured hardness was high, more than 50 HRC. It is considered that this is because the amount of C was excessive.

(3) in Comparative Examples 4 and 6, the as-manufactured hardness was low, and the distortion after manufacturing was small. However, Comparative Example 4 contained large amounts of Ni, Mo, and Co, and Comparative Example 6 contained large amounts of Ni and Mo, both leading to a high cost.

(4) In Comparative Example 7, the distortion after manufacturing was slightly large, and the absolute value of the distortion is more than 0.3%. It is considered that this is because the Ms point was lower than 50° C. due to the excessively large variable A.

(5) In all of Examples 1 to 10, the as-manufactured hardness was moderate, and the distortion after manufacturing was small. In addition, since the amounts of Ni, Mo, and Co were relatively small, the cost was low.

Although the embodiment of the present invention has been described in detail above, the present invention is not limited to the above embodiment, and various modifications can be made without departing from the gist of the present invention.

INDUSTRIAL APPLICABILITY

The metal powder (Fe-based alloy) according to the present invention can be used as a powder raw material for producing a mold that requires cooling (such as a plastic molding mold, a die casting mold, a hot stamping mold, and a tailored die quenching mold) through an additive manufacturing method.

In addition, the metal powder (Fe-based alloy) according to the present invention can be applied not only to additive manufacturing that involves strict shape control of a manufactured object, but also to overlaying welding that does not involve strict shape control of a manufactured object.

What is claimed is:

1. A metal powder for melt-solidification-shaping, consisting of:
0.05 mass %<C<0.25 mass %,
0.01 mass %<Si<2.0 mass %,
0.05 mass %<Mn<2.5 mass %,
2.5 mass %<Ni<9.0 mass %,
0.1 mass %<Cr<8.0 mass %,
0.005 mass %<N<0.200 mass %,
Cu<3.0 mass %,
Mo<2.0 mass %,
V<0.1 mass %,
Al<1.5 mass %,
P<0.05 mass %,
S<0.01 mass %,
O<0.08 mass %,
W<0.20 mass %,
Ti<0.20 mass %,
Co<0.05 mass %,
Sn<0.05 mass %,
Nb<0.05 mass %,
Ta<0.05 mass %,
Zr<0.05 mass %,
B<0.01 mass %,
Ca<0.01 mass %,
Se<0.03 mass,
Te<0.01 mass %,
Bi<0.01 mass %,
Pb<0.05 mass %,
Mg<0.02 mass %, and
REM<0.01 mass %, with the balance being Fe and unavoidable impurities,
and having a Ms point of 50° C. or higher and 280° C. or lower, wherein the composition satisfies the following expression (1):

$$11.5<15C+Mn+0.5Cr+Ni<20 \qquad (1),$$

in which C, Mn, Cr and Ni respectively represent the contents of C, Mn, Cr and Ni by mass %.

2. The metal powder for melt-solidification-shaping according to claim 1, further satisfying:
0.5 mass %≤Cu≤3.0 mass %.

3. The metal powder for melt-solidification-shaping according to claim 1, further satisfying at least one of:
0.2 mass %≤Mo≤2.0 mass %, and
0.05 mass %≤V≤0.1 mass %.

4. The metal powder for melt-solidification-shaping according to claim 2, further satisfying at least one of:
0.2 mass %≤Mo≤2.0 mass %, and
0.05 mass %≤V≤0.1 mass %.

5. The metal powder for melt-solidification-shaping according to claim 1, further satisfying:
0.3 mass %≤Al≤1.5 mass %.

6. The metal powder for melt-solidification-shaping according to claim 2, further satisfying:
0.3 mass %≤Al≤1.5 mass %.

7. The metal powder for melt-solidification-shaping according to claim 3, further satisfying:
0.3 mass %≤Al≤1.5 mass %.

8. The metal powder for melt-solidification-shaping according to claim 4, further satisfying:
0.3 mass %≤Al≤1.5 mass %.

* * * * *